United States Patent [19]
Anderson et al.

[11] 3,945,853
[45] Mar. 23, 1976

[54] METHOD OF SEALING A COLLATION OF BATTERY LAYERS TOGETHER

[75] Inventors: Kent V. Anderson, Madison; John M. Bilhorn, Edgerton, both of Wis.

[73] Assignee: ESB Incorporated, Philadelphia, Pa.

[22] Filed: Dec. 7, 1972

[21] Appl. No.: 312,927

[52] U.S. Cl. ............................. 136/175; 53/329
[51] Int. Cl.² ..................................... H01M 6/00
[58] Field of Search ............... 136/175; 53/329, 28

[56] References Cited
UNITED STATES PATENTS

| | | | |
|---|---|---|---|
| 3,004,094 | 10/1961 | Haessly | 136/175 |
| 3,048,954 | 8/1962 | Abel | 53/329 |
| 3,177,106 | 4/1965 | Seefluth et al. | 53/329 UX |
| 3,210,910 | 10/1965 | Seefluth | 53/329 UX |
| 3,246,448 | 4/1966 | Amic | 53/329 UX |
| 3,708,349 | 1/1973 | Macaulay | 136/175 |

*Primary Examiner*—John H. Mack
*Assistant Examiner*—H. A. Feeley
*Attorney, Agent, or Firm*—Raymond L. Balfour; Robert H. Robinson; Anthony J. Rossi

[57] ABSTRACT

The method, which provides liquid-impervious seals around opposed positive and negative battery electrodes in a collation of battery layers, concerns the need to apply energy around the opposed electrodes by some means other than and for a longer time period than the conventional pair of pressure rolls which have previously been used to seal moving battery layers. With this invention the seals are made by platens which either travel along with the moving collation during the sealing step or which are brought into contact with an increment of the collation which is temporarily stopped.

5 Claims, 13 Drawing Figures

NEAR START OF SEALING

Fig. 9A
NEAR START OF SEALING

Fig. 9B
NEAR END OF SEALING

METHOD OF SEALING A COLLATION OF BATTERY LAYERS TOGETHER

BACKGROUND OF THE INVENTION

It has previously been proposed to construct a continuous chain of batteries by properly collating a series of layers each of which contains intermittent electrode deposits and then sealing around each positive electrode and its opposite negative electrode. For examples of these processes see U.S. Pat. Nos. 3,004,093; 3,004,094; and 3,494,796. The previously proposed processes are ones in which the seals are accomplished by continuously moving the collation of layers past a pair of stationary pressure rolls; see U.S. Pat. Nos. 3,004,093 and 3,004,094.

A thoroughly liquid-impervious seal is essential around each positive electrode and its opposite negative electrode. Failure to achieve such a seal permits liquid to escape from the interior of the battery, resulting in reduced battery performance and shelf life and possibly resulting also in corrosion of surrounding objects.

Three factors associated with the sealing process—heat, pressure, and time—affect the degree and hence the quality of the seals. The magnitude of the time factor may be varied within a considerable range if the remaining two factors are properly adjusted. However, the conclusion is justified that truly high quality seals cannot be obtained by using stationary energy platens (e.g., pressure rolls or any other energy transferring mechanisms) together with a continuously moving collation of layers. This conclusion is based on the requirement that there is some minimum amount of time during which heat and/or pressure must be applied to get good seals, and that this minimum time is in excess of the time during which pressure is applied by the pressure rolls of the aforementioned previous processes, at least when the collated layers are moved at the speeds required for modern, economical production methods.

In U.S. Pat. No. 3,708,349 a method of constructing batteries is described which involves a collation of layers containing intermittent deposits of positive and negative electrodes. Liquid-impervious seals are required around opposed pairs of positive and negative electrodes. It is desirable that the collation of layers described in U.S. Pat. No. 3,708,349 move continuously throughout most if not all of the manufacturing process.

In U.S. Pat. No. 3,701,690 it is proposed to impregnate patches of adhesive having the configuration of closed loops into battery separator material and then to include those loops in collated layers of battery materials where the adhesive patches provide liquid-impervious seals around opposed pairs of positive and negative electrodes. The proposal disclosed in U.S. Pat. No. 3,701,690 may be used together with the construction method shown in U.S. Pat. No. 3,708,349.

It has previously been proposed that a pair of reciprocating platens could be used to press battery electrode active material in sheet form into moving grids; see U.S. Pat. No. 3,003,015.

SUMMARY OF THE INVENTION

This invention requires the use of collated battery layers. The layers include a positive electrode and a negative electrode, with the positive electrode being substantially opposite the negative electrode in the collation.

In one embodiment of the invention a liquid-impervious seal is made while the collation in moving. The sealing is performed by an energy platen which moves in the same direction as and substantially at the same speed as the collated layers. This embodiment may include either small pieces of the layers and electrodes collated as described above, or continuous layers along which are intermittent deposits of electrodes. Where continuous layers containing intermittent deposits of electrodes are sealed while in motion, the sealing may be done using at least two energy platens mounted on carriers which travel along a closed loop track. Each of the platens transfers energy to the layers while moving in the same direction as and substantially at the same speed as the collation; the longitudinal position of one platen with respect to an adjacent platen on the track is preferably adjustable, to permit compensation for possible slight irregularities in the position of the electrode deposits along the layers.

In another embodiment, the collation of either continuous or discrete, discontinuous battery layers may be sealed by temporarily stopping those layers at a sealing station having reciprocating platens which move perpendicularly rather than longitudinally with respect to the collation of layers.

In each of the embodiments it is preferred to bring the energy platen into physical contact with the collation so that the platen applies pressure to the areas to be sealed together. Heat is applied to and then subsequently removed from those areas while those areas are still under pressure from the platen.

Pressure is also preferably applied to the layers over the areas occupied by the electrodes before the layers are sealed around the electrodes.

BRIEF DESCRIPTION OF THE DRAWINGS

FIG. 5 is a cross-section of the battery shown in FIG. 4 taken along the line A—A of FIG. 4. FIG. 5 illustrates the liquid-impervious seals made in the areas of the layers surrounding the electrodes.

FIGS. 9A and 9B show a pair of reciprocating platens being used to produce seals in the battery layers. Accumulator means upstream from the sealing station permit the upstream portions of layers to continue in motion and be accumulated while the increments of the layers at the sealing station are temporarily stopped for sealing; FIG. 9A shows the collation of layers at the beginning of such a sealing step, while FIG. 9B shows the layers at a later time in the sealing operation with an accumulation of the layers being collected upstream from the sealing station.

DESCRIPTION OF THE PREFERRED EMBODIMENTS

Figure 1:
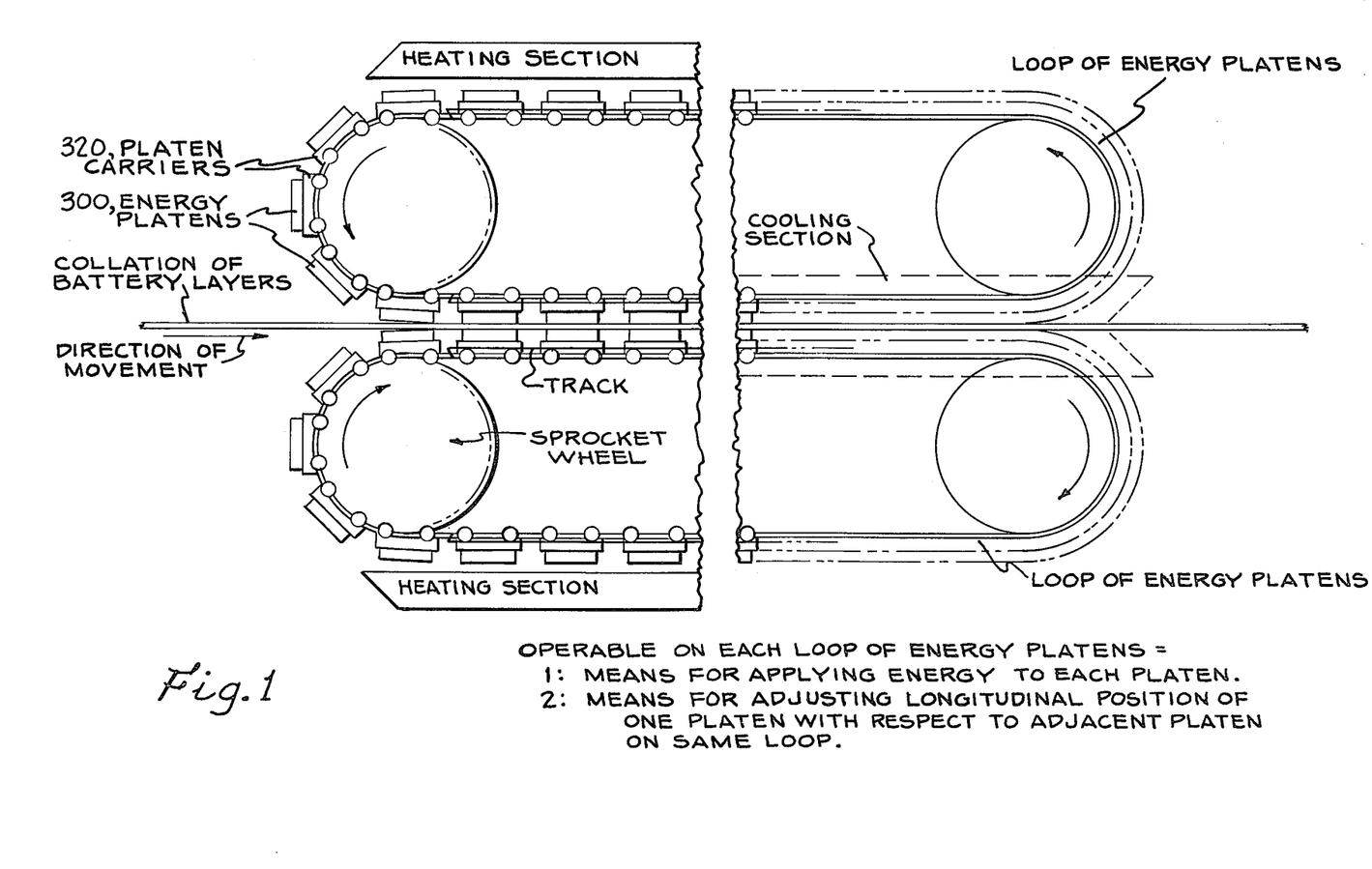
FIG. 1 is an elevational view showing a collation of battery layers moving past a sealing station where liquid-impervious seals are made around opposed pairs of positive and negative electrodes by energy platens carried along a closed loop track.

FIG. 1 shows a collation of continuous battery layers moving through a sealing machine at a sealing station. The machine contains a pair of tracks each of which is in the shape of a closed loop. Along each track travels a plurality of energy platens 300 mounted on carriers 320. The platens 300 travel in the same direction and substantially at the same speed as the collation as the layers moving through the sealing machine. The platens transfer energy to the layers in a manner and amount sufficient to produce liquid-impervious seals around opposed pairs of positive and negative electrodes in the collation of layers.

Figures 2, 3, 4:
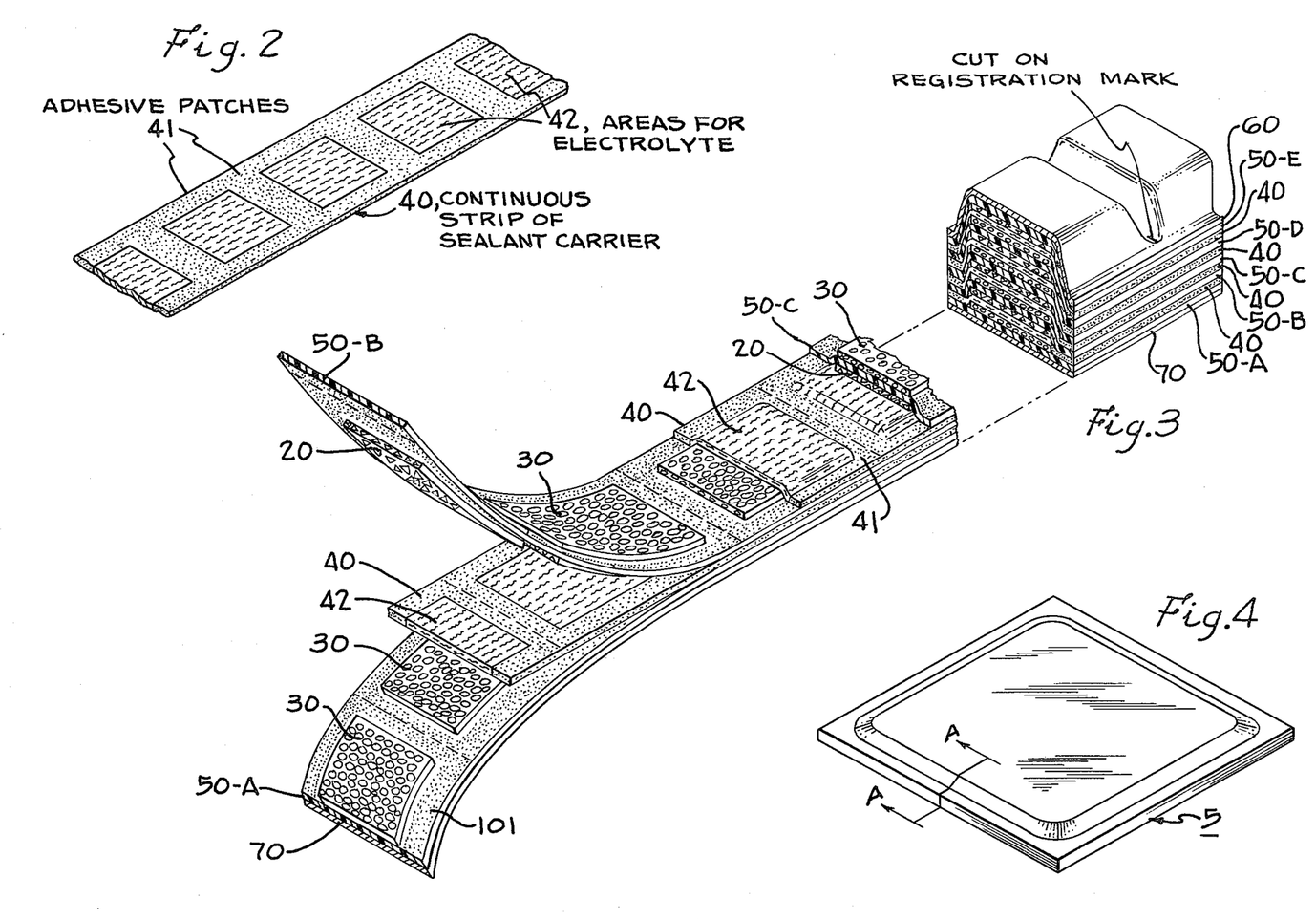
FIG. 2 illustrates a continuous strip of sealant carrier containing adhesive patches which may be used in obtaining the seals. One or more such continuous strips may be included in the collation shown in FIG. 1.
FIG. 3 shows continuous battery layers in proper collation. The collation includes layers on which there are intermittent deposits of positive electrodes, layers on which there are intermittent deposits of negative electrodes, and strips of sealant carriers such as are shown in FIG. 2.
FIG. 4 shows a battery after the layers have been collated as shown in FIG. 3, sealed around opposed pairs of electrodes, and cut apart to structurally disconnect one battery from others.

FIGS. 2 and 3 illustrate layers typical of those which may be included in the collation. FIG. 2 shows a continuous strip 40 which functions both as a carrier of adhesive patches used in sealing the batteries and as a separator between positive and negative electrodes in the batteries. To serve both of these purposes the strip 40 is impregnated with adhesive patches 41 each of which is in the form of a closed loop. The areas 42 inside these closed loops, which are not impregnated with the adhesive, perform the function as separators between electrodes in the batteries and provide areas where electrolyte may be retained.

FIG. 3 illustrates the battery layers in proper collation. At the bottom of the collation is a continuous layer comprising a laminate of electrically conductive plastic 50-A and metal 70, and along the upper or inside face of this layer are intermittent deposits of negative electrodes 30. Each of the negative electrodes 30 is set back from the edges of the layer 50-A so that there is an area of that layer extending around and beyond each of the negative electrodes 30; these surrounding areas, shown in FIG. 3 as being coated with adhesive 101, are the locations where liquid-impervious seals are made by the sealing machine.

Progressing upward in the collation of layers shown in FIG. 3, the next layer is a sealant carrier 40 of the type shown separately in FIG. 2. The sealant carrier 40 is positioned or registered in the collation so that its adhesive patches 41 will mate with adhesive patches 101 in the underlying layer while the areas 42 inside the adhesive patches 41 overly the negative electrodes 30.

Continuing the progression upward through the collation, the next layer shown in FIG. 3 is a layer of electrically conductive plastic 50-B which constitutes a chain of duplex electrodes. On the underneath side of this layer are intermittent deposits of positive electrodes 20 each of which is set back from the edges of that layer so that there is an area of layer 50-B extending around and beyond each positive electrode; these surrounding areas may also be coated with an adhesive. The positive electrodes 20 on the lower side of layer 50-B are positioned to be above, substantially opposite, and facing the negative electrodes 30. On the upper side of layer 50-B are intermittent deposits of negative electrodes 30, each of which is opposite one of the the positive electrodes 20 on the other side of layer 50-B; the upper side of layer 50-B therefore, resembles the upper side of layer 50-A.

Moving still upward in the collation from layer 50-B, there will alternately be additional layers of sealant carrier 40 and electrode carriers 50-C, 50-D, etc., until as many layers as desired have been included. The uppermost layer, a counterpart to the bottom layer, is shown as comprising a laminate of electrically conductive plastic 50-E and metal 60, with the lower or conductive plastic side of this laminated layer carrying intermittent deposits of positive electrodes 20 which are positioned directly above the intermittent deposits of positive and negative electrodes 20 and 30 respectively carried by the layers beneath.

Figure 5:
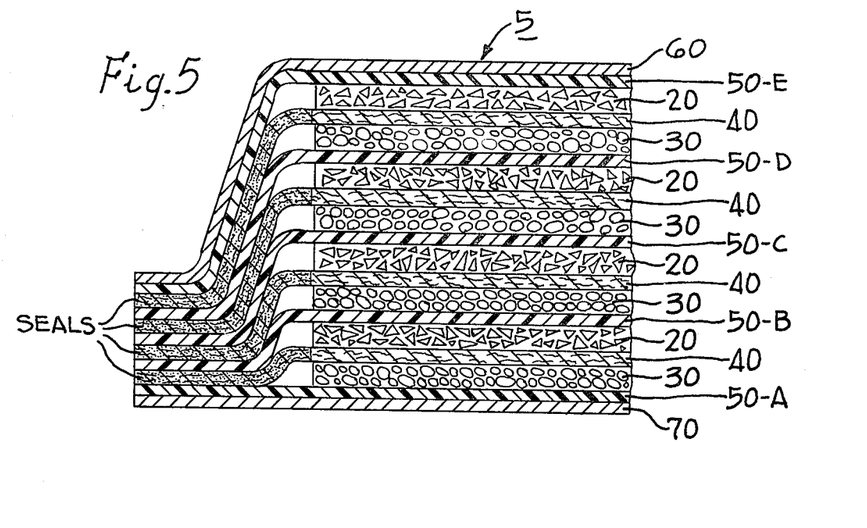

FIG. 4 shows a battery 5 after the layers shown in FIG. 3 have been collated together, sealed around opposed pairs of electrodes 20 and 30, and cut apart to structurally disconnect one battery from others. FIG. 5, which is a cross-section of the battery 5, shows the liquid-impervious seals which are obtained with the use of this invention.

Figure 6:
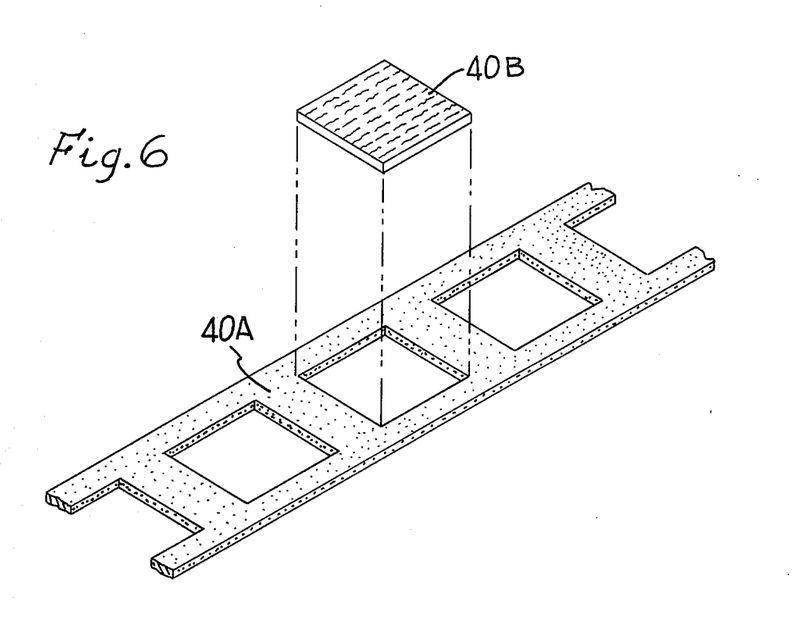
FIG. 6 shows a continuous strip of sealant carrier having spaced openings in which discrete battery components may be fitted. The sealant carrier shown in FIG. 6 may be used in the collation as a substitute for the one shown in FIG. 2.

FIG. 6 illustrates an alternative sealant carrier to the one shown in FIG. 2. In FIG. 6 the sealant carrier 40A (which corresponds to the adhesive patches 41 of the carrier 40 shown in FIG. 2) has spaced openings (corresponding to areas 42 of FIG. 2) into which discrete battery components 40B may be fitted. The components 40B may be used to physically separate positive and negative electrodes from each other and to contain electrolyte. The construction shown in FIG. 6, unlike the one shown in FIG. 2, permits the material containing the adhesive to be different from the material which contains electrolyte.

Figure 7:
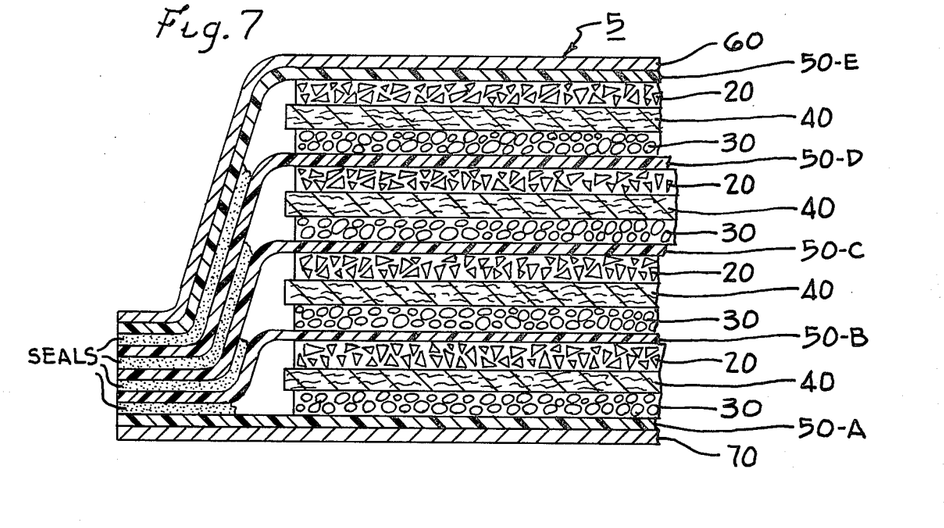
FIGS. 7 and 8 show the cross-sections of batteries constructed differently from the one shown in FIG. 5 but having collations of layers in which seals are made around opposed pairs of electrodes.

FIG. 7 illustrates a cross-section of a battery similar to that shown in FIG. 5 except that the layers 40, which still perform the functions of physically separating electrodes from each other and of containing electrolyte, do not extend outward beyond the electrodes into the areas where the liquid-impervious seals are made. The seals shown in FIG. 7 are achieved with rings of adhesive 100 which extend around and enclose the opposed pairs of electrodes; these adhesive rings can be printed onto the electrode-carrying layers 50-A through 50-E in a manner analagous to that shown in FIG. 3. The layers 40, which in FIG. 7 are shown as discrete pieces rather than as continuous strips, are included in the collation at a convenient point somewhere upstream from the sealing station.

Figure 8:
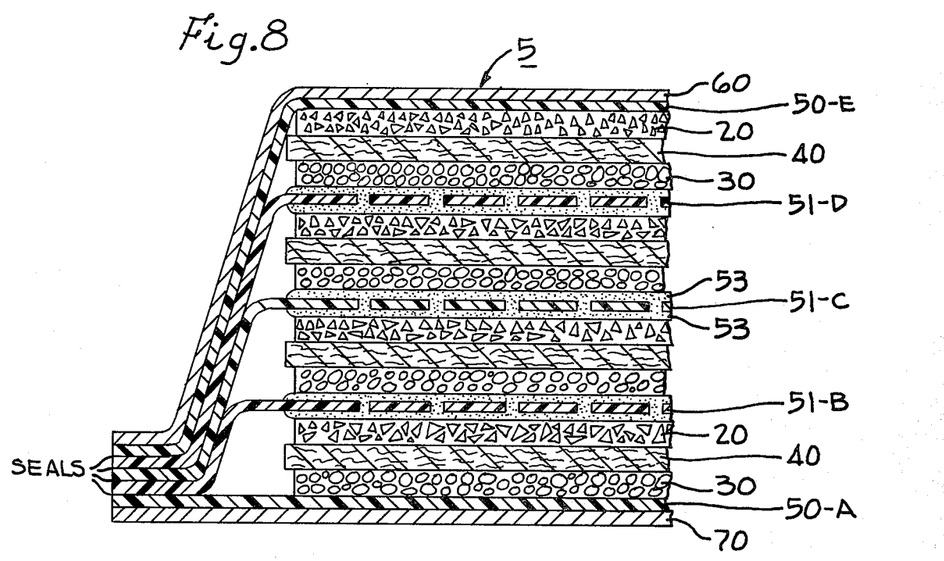

FIG. 8 shows a cross-section of a battery constructed somewhat differently from the one shown in FIG. 7. In FIG. 8, the layers 51-B through 51-D (corresponding to layers 50-B through 50-D of FIG. 7) are made from an electrically nonconductive material, and an electrically conductive material 53 is applied to both sides of and through holes in each nonconductive member 51; the electrical conductivity between the positive electrode 20 of one cell and the negative electrode 30 of the adjacent cell is through the conductive material 53. The conductive material 53 does not extend to the seal area at the periphery of the battery, and the seals may be made by sealing the layers 50-A, 51-B, 51-C, 51-D, and 50-E directly together, e.g., by heat sealing them together.

FIG. 3 has shown the layers 50-A through 50-E functioning as carriers for intermittent deposits of electrodes during assembly of the batteries. As an alternative, the layers 40—which have already been shown performing the functions of sealant carrier, elecrode separator, and electrolyte retainer—can also function as the carriers or substrates onto which electrodes are deposited prior to battery assembly, and this is true whether the layers 40 are included in the collation as continuous strips or as short, discrete pieces; see U.S. Pat. No. 3,694,268 for the use of a continuous separator strip in this manner. Regardless of which layer is used to carry the electrodes into the collation, the result is that in the collation there is in each cell a layer which has a positive electrode along one side thereof and a layer having a negative electrode along one side thereof (e.g., layers 50-A through 50-E in FIGS. 3, 5, and 7, layers 50-A, 51-B, C, D, and 50-E in FIG. 8) and the electrodes are set back from the edges of the layers so that there are areas of the layers extending around and beyond the electrodes where liquid-impervious seals can be made.

The illustrations and descriptions given so far have shown the electrodes set back from the edges of the layers on which they are deposited, with the areas surrounding the electrodes being the locations where liquid-impervious seals are made. As an alternative, the seals may be made directly to the periphery of the positive and/or negative electrodes themselves. For instance, where the composition of the electrodes is such that they are porous in nature, the seals may be made by causing an adhesive to be impregnated into those pores. Where the electrodes are nonporous in nature, e.g., sheet metal negative electrodes, the seals may be made directly to them by materials such as adhesives, heat seal materials, etc. The point to be made is that while the drawings illustrate the areas surrounding the electrodes being the locations where the seals are made, the seals may also be produced at the periphery of and in direct contact with the electrodes themselves.

While the collations and batteries illustrated in the drawings show multicell battery constructions, the invention is also applicable to the construction of single cell batteries. However, because of the greater number of layers inherently required by multicell batteries, the sealing time required to obtain a satisfactory, liquid-impervious seal will tend to be greater with multicell than with single cell batteries and hence, to that extent, it may be more necessary or desirable to utilize this invention with multicell than with single cell battery constructions.

Figure 9A:
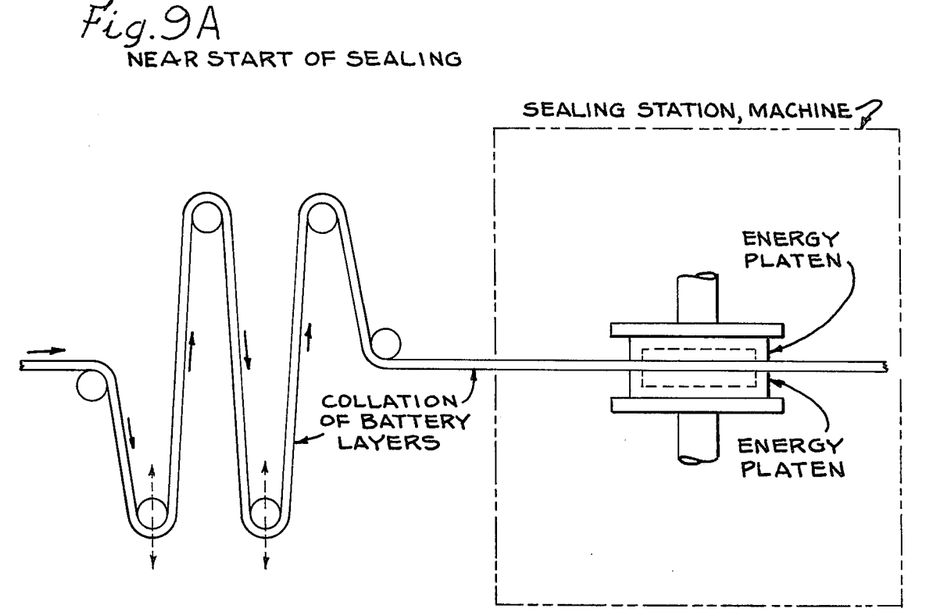
Figure 9B:
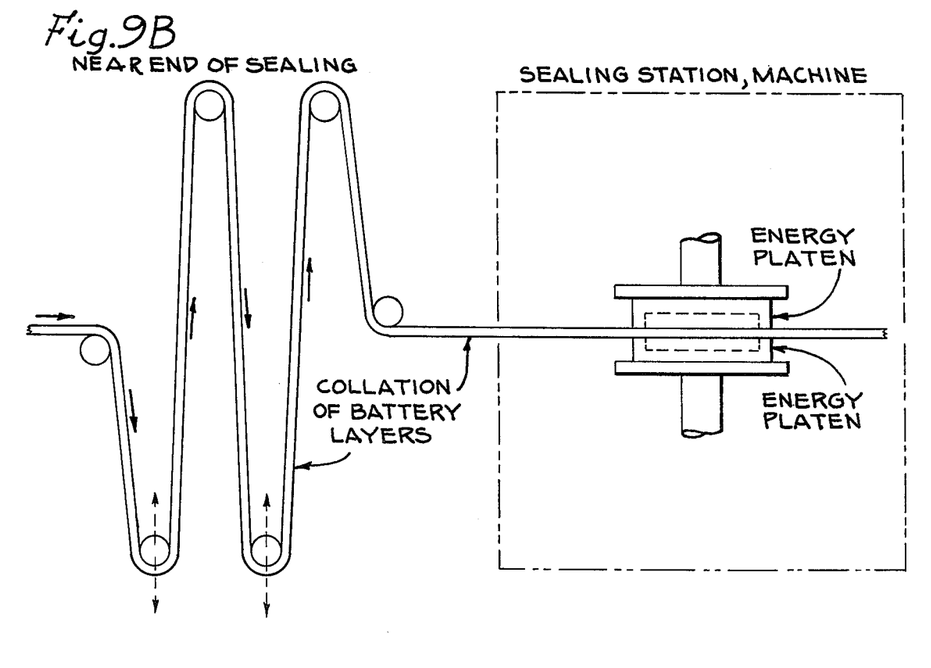

FIGS. 9A and 9B illustrate how the liquid-impervious seals may be obtained in a collation of continuous layers using a pair of reciprocating platens. The moving collation travels past a sealing station accumulator the increment in the collation to be sealed is temporarily stopped, either by also temporarily stopping the portions of the collation upstream from the sealing station or by collecting those upstream portions on accumulator means as they continue in motion; this latter alternative is shown in FIGS. 9A and 9B, with FIG. 9A showing only a small length of the collated layers in the accumulators at the beginning of the sealing step and FIG. 9B showing the greater length of the layers in the accumulator at the conclusion of the sealing operation. When the sealing step is completed, the accumulaor means upstream from the sealing station release another increment of the collation which then advances to the sealing station to be sealed. Accumulator rolls capable of performing the illustrated functions, which rolls are commercially available, permit other steps required in the construction of batteries to be performed on continuously moving strips upstream from the sealing station while the collated layers are temporarily stopped at the sealing station. If desired, additional accumulator means can be added to the battery production line just downstream from the sealing station to let out previously accumulated lengths of the collation while the stepped increment at the sealing station is being sealed.

Collations of discrete, discontinuous layers may also be sealed by being temporarily stopped at the reciprocating platens of the sealing machine shown in FIGS. 9A and 9B.

Figure 10:
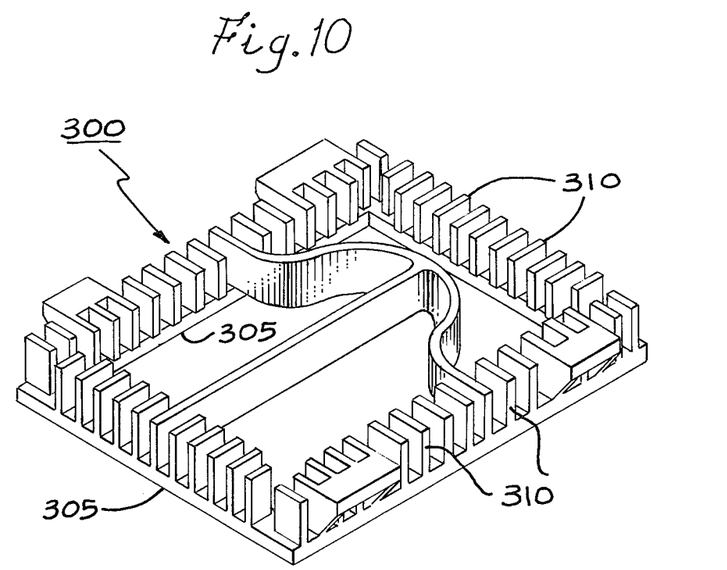
FIG. 10 shows an energy platen.

FIG. 10 shows an energy platen 300 which may be used with this invention. The platen 300 may be used either with the rotatary-type machine shown in FIG. 1 or with the reciprocating type machine shown in FIGS. 9A and 9B. The particular platen 300 shown in FIG. 10 is intended to make physical contact with and to apply pressure and heat to the areas around the electrodes in the collation, and for that purpose the platen is provided with a closed-loop surface 305 which contacts the collation and with a heat transfer system 310 which transfers heat into and away from the surface 305 rapidly and uniformly. It may be desirable to include one or more grooves in each platen to provide for the controlled squeeze-out of seal materials such as adhesives.

Figure 11:
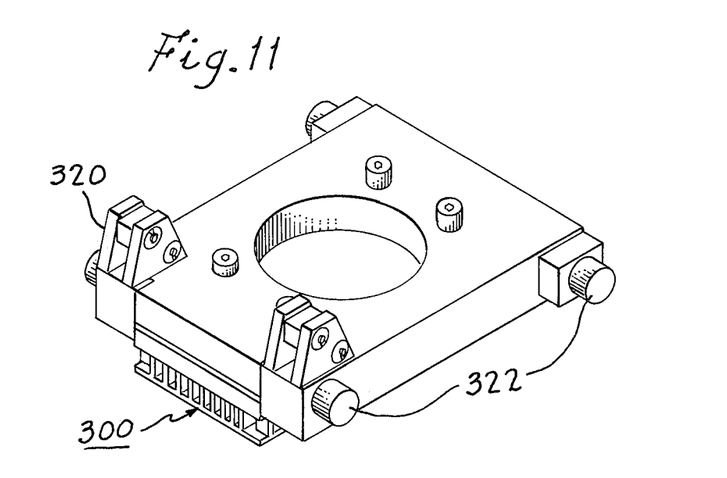
FIG. 11 shows an energy platen carrier.

FIG. 11 shows a carrier 320 onto which a platen 300 may be mounted. The carrier 320 rolls along the track in the manner shown in FIG. 1.

Figure 12:
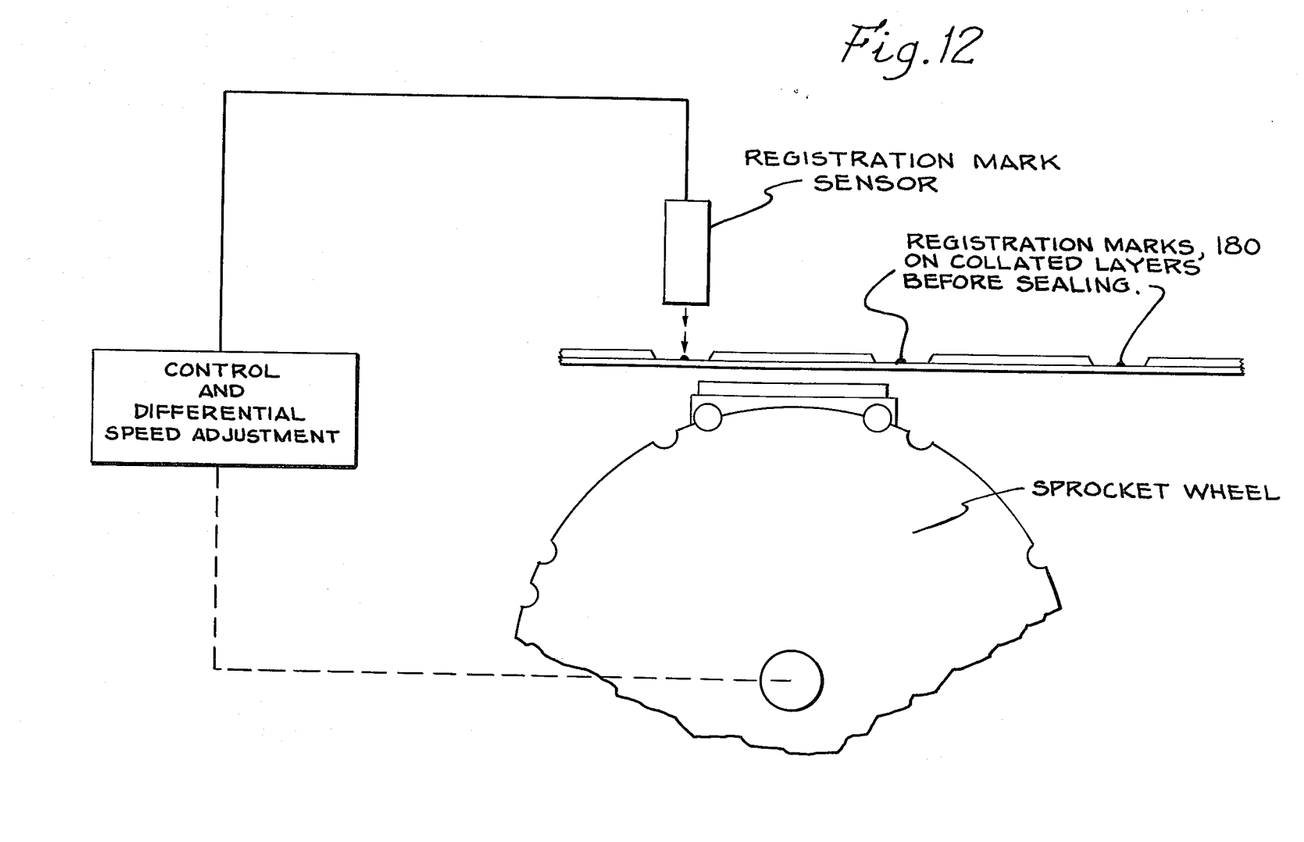
FIG. 12 is a schematic view illustrating means which adjust the longitudinal position of one platen with respect to an adjacent platen traveling along the closed loop track.

FIG. 12 is a schematic view illustrating means which adjust the longitudinal position of one platen 300 with respect to an adjacent platen traveling along the closed loop track. Such adjustment means, which permit each platen 300 to be precisely registered with respect to the increment or portion of the collation which it is to seal, provide compensation for minor and unintended deviations in the designed lengths within the collation. Referring to FIGS. 1 and 12 together, these adjustment means may include a sensor which reads registration marks appearing on the exterior of the collation. If a registration mark 180 is not precisely where it should be in order for the platen 300 to mate as intended with the collation, the sensor activates a control and differential speed adjustment mechanism which in turn temporarily adjusts the rotational speed of a sprocket wheel 330. This speeds up or slows down the particular platen 300 and carrier 320 whose positions are to be determined with respect to the registration mark 180. The sensor, control, differential speed adjustment mechanism, and sprocket wheel can thus vary the position of each platen and carrier with respect to the position of an adjacent platen and carrier, within predetermined limits. It will be noted that the platen carrier 320 has roller wheels 322 which are engaged by recesses in the sprocket wheel 330. After these roller wheels 322 disengage the wheel 330 they enter a track in the machine where they are spring-loaded against the collation and where they travel free-wheeling in a plane parallel to the direction of travel; the free-wheeling motion prevents the platens from exerting forces which might result in the longitudinal movement of one layer with respect to another layer in the collation.

The machine specifically illustrated in FIG. 1 utilizes energy platens which come into physical contact with and apply pressure against the collation of battery layers. The machine is equipped with means to heat the platens before they come into contact with the collation (e.g., a heating section using, for instance, radiant lamps) and also with a cooling section where heat can be removed from the collation. Preferably heat is transferred from he platens to the areas of the layers extending around and beyond the electrodes while those areas are under pressure from the platen; a further preference is to continue to have the platens exert pressure against the collation when the heated areas in the collation are subsequently cooled. With both thermoplastic and thermosetting materials it is believed that better quality seals will result if the surfaces being sealed together are subjected to both heat and pressure for a finite increment of time longer than that which can be exerted by the stationary pressure rollers of the prior art. Similarly, where thermoplastic materials are used it is believed to improve the quality of the seals to cool the areas being sealed together while those areas are still under pressure. The exact combination of temperature and the time and magnitude of pressure applied by the platens is subject to rather wide variations, depending upon such factors as: the mass and therefore the thermal content of the platens; the thermal conductivity of the material from which the platens are made; the physical configuration of the platens; the number, thickness, and thermal conductivity of the layers in the collation; the nature of the phenomenon associated with sealing two specific materials together; and possibly others. While it is not possible to define in absolute terms either maxima or minima for the room temperature, time and pressure required for the platens to produce high quality seals in the collation, it is possible to state a minimum requirement in relative terms, i.e., the magnitude and time duration of the heat and pressure must be greater than that obtained with the use of conventional, stationary pressure rolls.

Direct physical contact between the energy platens and the collation is not necessary in all embodiments of this invention. For instance, energy platens such as dielectric heating platens which transfer energy to the collation by the emission of energy waves need not necessarily make physical contact with the layers; subsequently the collated layers may be cooled and compressed simultaneously by controlled air pressure. By the same token, the application of heat by the platens to the collation is not required in all instances such as, for instance, where sealing is accomplished with certain pressure sensitive adhesives. Platens such as ultrasonic horns which develop heat in the collation may also be used. Where heat is applied to the collation as a step in the sealing, the heat need not necessarily be applied entirely or even at all in a direction perpendicular to the top and bottom layers in the collation; energy may be directed inwardly from the sides, in planes parallel to the layers in the collation. And while a liquid-impervious seal is required around the entire perimeter of opposed positive and negative electrodes in the finished batteries, the seal need not be produced around the entire perimeter in one step; one platen and sealing step can be used to produce seals across the width of the collation, at both ends of a pair of electrodes, while a different platen and a different step can be used to produce seals along the length of the collation at both sides of the pair of electrodes.

Collations of battery layers utilizing a wide variety of materials may be sealed by the process of this invention, including both thermoplastic and thermosetting materials. The sealing operation may produce physical and/or chemical changes in at least some of the layers, at least on a temporary basis, or a simple wetting action caused by sufficient pressure may result without other physical or chemical changes.

As used herein, the terms, "seal", "sealing", and the like are used broadly to mean the act of adhering one body of material to another and/or two two bodies of material adhered together, as appropriate to the context in which the terms appear. Except where clearly required, the terms are not intended to imply a requirement that the two bodies of material be of dissimilar physical and/or chemical composition from each other before, during, or after being sealed, or that sealing necessarily produces a physical and/or chemical change in all cases even on a temporary basis.

It may be desirable to squeeze the areas of the collation overlying the opposed pairs of electrodes together just prior to sealing, either to wet the electrodes with electrolyte and/or to squeeze air out of the collation. The squeezing or compression can be achieved by pads which are situated inside the seal-producing components of the energy platens.

Batteries made using this invention may employ a wide variety of positive and negative electrode materials and a wide variety of electrochemical systems including both primary and secondary systems. Among the positive electrode materials are such commonly used inorganic metal oxides as manganese dioxide, lead dioxide, nickel oxyhydroxide, mercuric oxide and silver oxide, inorganic metal halides such as silver chloride and lead chloride and organic materials capable of being reduced such as dinitrobenzene and azodicarbonamide compounds. Among the negative electrode materials are such commonly used metals as zinc, aluminum, magnesium, lead, cadmium, and iron. This invention may employ the electrolytes commonly used in the LeClanche system (ammonium chloride and/or zinc chloride), various alkaline electrolytes such as the hydroxides of potassium, sodium and/or lithium, acidic electrolytes such as sulfuric or phosphoric acid, and nonaqueous electrolytes, the electrolytes of course being chosen to be compatible with the positive and negative electrodes.

Among the wide variety of electrochemical systems which may be used in producing batteries with this invention are those in which the positive electrodes comprise manganese dioxide, the negative electrodes substantially comprises an acidic solution of inorganic salts. Another commonly known system is the alkaline manganese system in which the positive electrodes comprise manganese dioxide, the negative electrodes comprise zinc, and the electrolyte substantially comprises a solution of potassium hydroxide. Other aqueous elecrolyte systems including those of nickel-zinc, silver-zinc, mercury-zinc, mercury-cadmium, and nickel-cadmium may also be used. Systems employing organic positive electrodes and acidic electrolytes may also be used, including rechargeable systems using azodicarbonamide compound electrodes and LeClanche electrolyte.

We claim:

1. The method of producing a seal around an increment of continuous, collated battery-layers, the collation including a layer having an increment on which there is a deposit of positive electrode, the collation also including a layer having an increment on which there is a deposit of negative electrode, the collation being further characterized as having the positive electrode substantially opposite the negative electrode, the method comprising the steps of:
- a. moving the collation of continuous battery layers;
- b. temporarily stopping the increment of the collation at a sealing station;
- c. moving an energy platen with respect to the stopped increment into a position so that the platen can transfer energy to the areas of the layers of the stopped increments surrounding the pair of opposed electrodes; and
- d. transferring energy from the platen to the layers in a manner, in an amount, and for a time sufficient to heat the areas of the layers surrounding the electrodes;
- e. subsequently maintaining pressure against the heated layers while simultaneously cooling the heated layers;
- f. removing the increment of the collation from the sealing station while the simultaneously advancing another increment of the collation to the sealing station; and,
- g. repeating steps (b), (c), (d), and (e) with respect to the other increment of the collation.

2. The method of claim 1 in which pressure is applied to the increments over the areas occupied by the electrodes before energy is transferred to the areas being sealed together.

3. The method of claim 1 in which, while the increments at the sealing station are temporarily stopped, the portions of the layers upstream from the sealing station continue to move and are accumulated by accumulator means.

4. The method of sealing a collation of battery layers, the collation including a layer on which there is a deposit of positive electrode, the collation also including a layer on which there is a deposit of negative electrode, the collation being further characterized as having the positive electrode substantially opposite the negative electrode, the method comprising the steps of:
- a. moving the collation of battery layers;
- b. temporarily stopping the collation at a sealing station;
- c. moving an energy platen with respect to the stopped collation into a position so that the platen can transfer energy to the areas of the stopped collation to be sealed together; and,
- d. transferring energy from the platen to the layers in a manner, in an amount, and for a time sufficient to heat the areas of the layers surrounding the electrodes;
- e. subsequently maintaining pressure against the heated layers while simultaneously cooling the heated layers;
- f. removing the increment of the collation from the sealing station while simultaneously advancing another increment of the collation to the sealing station; and,
- g. repeating steps (b), (c), (d), and (e) with respect to the other increment of the collation.

5. The method of claim 4 in which pressure is applied to the collation over the areas occupied by the electrodes before energy is transferred to the areas surrounding the electrodes.

* * * * *